United States Patent [19]
Grill

[11] Patent Number: 4,696,252
[45] Date of Patent: Sep. 29, 1987

[54] SIGNALLING DEVICE

[76] Inventor: Edward Grill, Box 562, Harlem, Mont. 59526

[21] Appl. No.: 868,688

[22] Filed: May 30, 1986

[51] Int. Cl.$^4$ .............................................. B64B 1/40
[52] U.S. Cl. .............................. 116/210; 116/DIG. 9; 206/573; 206/803
[58] Field of Search .......... 116/210, DIG. 8, DIG. 9; 206/227, 573, 803; 441/83, 89, 94; 2/DIG. 3, DIG. 6; 285/308, 320; 24/500, 532, 510, 513, 16 R, 19, 338, 339; 141/313, 314, 383, 387; 137/231; 244/31, 33; 222/5

[56] References Cited

U.S. PATENT DOCUMENTS

| | | | |
|---|---|---|---|
| 1,797,383 | 3/1931 | Wahl et al. | 137/231 |
| 2,160,974 | 6/1939 | Lueck | 116/210 |
| 2,360,572 | 10/1944 | Mejean | 285/320 |
| 2,923,917 | 2/1960 | McPherson et al. | 116/210 |
| 3,046,575 | 7/1962 | Davis et al. | 222/5 |
| 3,132,626 | 5/1964 | Reid | 116/210 |
| 4,042,882 | 8/1977 | Camacho et al. | 116/210 |
| 4,094,267 | 6/1978 | Davis, Jr. | 116/210 |
| 4,114,561 | 9/1978 | Asaro | 116/210 |
| 4,123,987 | 11/1978 | Singerle et al. | 116/210 |
| 4,165,826 | 8/1979 | Chica | 2/DIG. 6 |
| 4,295,438 | 10/1981 | Porter | 116/210 |
| 4,379,705 | 4/1983 | Saotome | 441/94 |
| 4,416,433 | 11/1983 | Bellina | 244/33 |
| 4,573,933 | 3/1986 | Cameron | 441/16 |
| 4,595,121 | 6/1986 | Schultz | 222/1 |

FOREIGN PATENT DOCUMENTS

| | | | |
|---|---|---|---|
| 2447729 | 10/1980 | France | 116/DIG. 9 |
| 1393572 | 5/1975 | United Kingdom | 244/31 |

Primary Examiner—Charles Frankfort
Assistant Examiner—W. Morris Worth
Attorney, Agent, or Firm—Richard C. Litman

[57] ABSTRACT

An improved emergency signalling device for use by skiers, hunters and other persons who may be exposed to the outdoors, remote from civilization, and who may in the course of their avocation or occupation become injured or disabled while far removed from contact with assistance. The device comprises a package, which may be secured by straps to a limb or the body of the person, the package containing a signal balloon, a helium container and a reel for paying out a length of tether line together with means for easily inflating the balloon with the helium and sending it aloft to attract the attention of searchers who may be looking for the person in distress. Radar reflective streamers are provided to improve the radar reflectivity of the balloon and thus make it easier to locate by searchers using radar from the air or water. A non-freezing impact valve is provided for releasing gas from the helium container into the balloon and the valve may be operated by pressure applied by any part of the user's body should he not be able to use his hands for the purpose.

11 Claims, 8 Drawing Figures

SIGNALLING DEVICE

BACKGROUND OF THE INVENTION

This invention is directed to a an improved emergency signalling device for use by skiers, hunters and other persons who may be exposed to the outdoors, remote from civilization, and who may in the course of their avocation or occupation become injured or disabled while far removed from contact with assistance. The device comprises a package, which may be secured by straps to a limb or the body of the person, the package containing a signal balloon, a helium container and a reel for paying out a length of tether line together with means for easily inflating the balloon with the helium and sending it aloft to attract the attention of searchers who may be looking for the person in distress. Radar reflective streamers are provided to improve the radar reflectivity of the balloon and thus make it easier to locate by searchers using radar from the air or water. A nonfreezing impact valve is provided for releasing gas from the helium container into the balloon and the valve may be operated by pressure applied by any part of the user's body should he not be able to use his hands for the purpose. A safety pin is provided to prevent operation of the valve by inadvertant impact and provision is made for the safety pin to be withdrawn by the users teeth or other other pressure exerted thereon should he not be able to use his hands for the purpose.

DESCRIPTION OF THE PRIOR ART

Various prior art devices, apparatus and methods of emergency signalling are known and have been described in the prior patent art. Typical of these are the devices shown in U.S. Pat. Nos. Shearer, 3,721,983; Davis, 4,094,267; Asaro, 4,114,561; Porter, 4,295,438 and Bellina, 4,416,433.

The Shearer and Davis patents merely suggest a package having a single needle valve assembly for the gas container, a line for controlled flight and colored indicia secured on the balloon. Asaro improves these teachings by use of two valves in the systems and having the package sewn onto the clothing of the user.

The containers of Porter and Bellina are interesting in that they provide spaces for a gas container, a balloon receiving space and a reel arrangement.

These patents teach and dislose various types of signal balloon and rescue locator signal devices but none of these patents disclose the specific details of the combination of the new device and package in such a way as to bear upon the claims of the present invention.

OBJECTS OF THE INVENTION

It is an object of the present invention to provide a new device and package arrangement having a casing which holds a gas container, a deflated balloon, a nonfreezing impact valve system, which upon impact or pressure applied by the user may deliver gas from the container to the balloon and means for a tether line from the case to be paid out as the balloon is released for flight while the case holding the other end of the tether line is still secured to the user.

Another object of the present invention is to provide a signal system which may be secured to a limb or the body of the user by elastic and Velcro straps so that the device may be worn in any convenient location, e.g., on the arm or the leg or the back of the user.

These together with other objects and advantages which will become subsequently apparent reside in the details of the construction and operation as will be more fully described and claimed.

BRIEF DESCRIPTION OF THE DRAWINGS

FIG. 8 is a bottom section view showing the engagement of the spring members with the stem.

DESCRIPTION OF THE PREFERRED EMBODIMENTS

Figure 1:
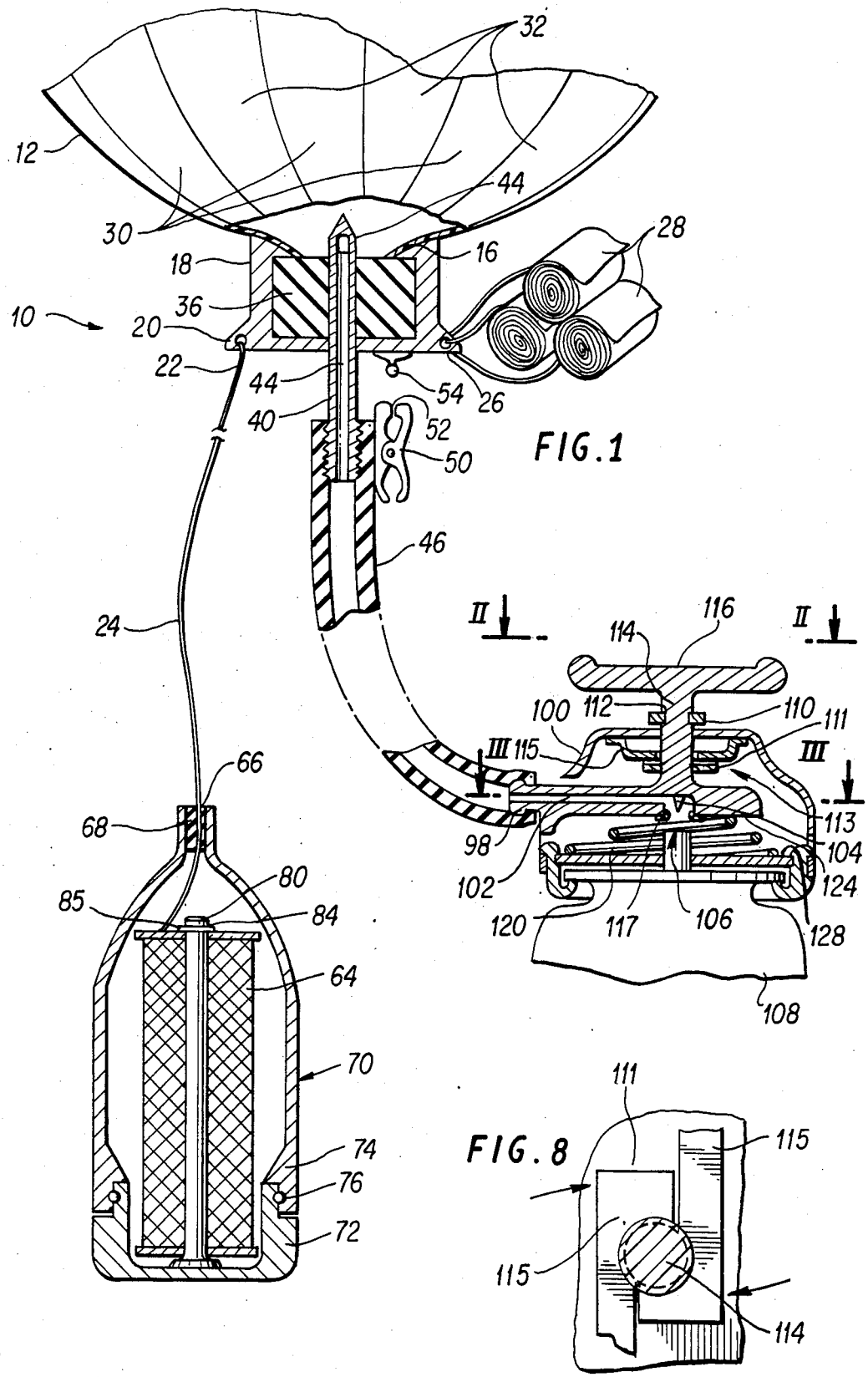
FIG. 1 is a partial sectional view of an asembly of the components of the signal balloon device for containment within a package according to a preferred embodiment of the present invention.

Referring now to the drawings there is shown a signal balloon device 10 including a plastic or Mylar balloon 12 which is 24" to 30" in diameter and in which the balloon ends 16 are secured onto an anchor member 18 forming a gas-tight seal. At the lower extremities of the anchor member 18 is an anchor element 20 for receiving one end of a monofilament tether line 24 and a second anchor element 26 for securing a plurality of rolled aluminized Mylar radar reflective streamers 26.

The balloon 12 may contain sectors of alternately disposed metallized silver sections 30 and flourescent orange sections 32. Within the anchor member 18 is a highly pliable elastomeric material body 36 that fills thoroughly a cavity formed by the anchor member and forms a bond with the balloon ends 16. The elastomeric body forms a self sealing septum which will seal gas within the balloon when the needle 40 is withdrawn from body 36. Needle 40 has an axial hollow passage 44 with one end terminating inside the balloon and the other end of needle 40 is securely attached to a flexible hose 46.

At the end of hose 46, proximate the anchor member 18 is an alligator spring release clip 50 having jaws 52 that may engage and disengage with a projection 54 extending from anchor member 18. During the period of balloon inflation to be described below the clamp is affixed or attached to the projection 54 and after the balloon is inflated the clamp may be released manually or by a sharp pull so that the balloon may be released for flight.

The tether line 24 may be 100 meters or 300 feet in length, and as shown in FIG. 1 the other end of the line is wound, when packaged, passing through an opening 66 in a rubber plug 68 inserted in an opening of a generally oblong container 70. The plug 68 provides a degree of resistance to the outward play of the line and keeps the reel 64 from turning too fast so as to cause snarls or tangles. The container 70 has a base portion 72 and a removable upper portion 74 held in position by a sealing and moisture proof closure 76. The reel 64 is rotatably mounted on a spindle 80, as shown, and a notch 84 in the spindle provides for a securing member 85 to retain the reel on the spindle. The arrangement as shown is found to provide for improved non-tangling of the monofilament tether line as it is paid out from the container when pulled by the rising balloon.

The other end of the flexible hose 46 terminates in a nipple 98 of an impact valve 100. The impact valve 100 is a non-freezing impact or force operable valve that includes structure having a conduit 102 supporting a sharp penetrating member 104 adapted to penetrate the seal 106 of a helium container 108. By removing a safety pin 110 engaging a recess 112 in the valve stem 114 and then depressing the handle 116, the penetrating needle impacts the seal 106 to puncture it causing gas to escape under pressure from the container 108 through the flexible hose 12 into the balloon 12.

When safety pin 110 is removed and handle 115 is depressed by the user, stem 114 is forced downward until needle 104 pierces seal 106. Seal 117 prevents gas leakage past the seal 106 and stem 116 is retained in its engaged position by engagement of notch 112 by spring member 115 supported by bracket 111. Member 113 secured to stem 114 retains the valve stem in its open position under the pressure of spring 120.

The valve 100 is constructed of plastic material rendering it proof against freezing by snow or water entering the container.

The valve 100 includes a helical spring 120 for maintaining the valve stem in its open position. The spring 120 is tensioned between a lower surface 124 of the conduit 102 and an upper surface 128 of the gas container 108.

Figure 2:
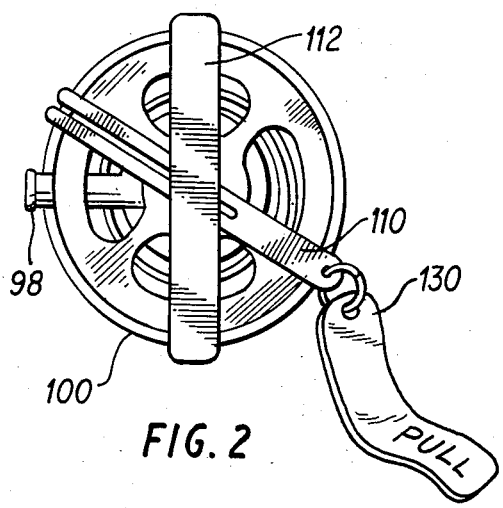
FIG. 2 is a top view taken along the line 2—2 of FIG. 1.
Figure 3:
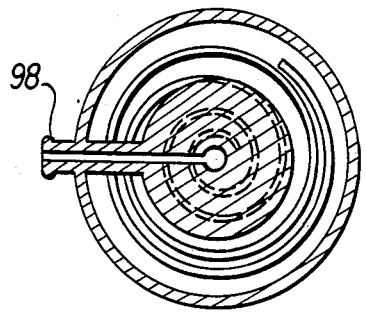
FIG. 3 is a sectional view taken along the line 3—3 of FIG. 1.
Figure 4:
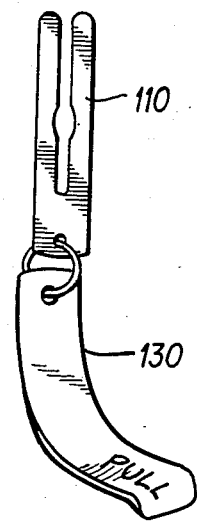
FIG. 4 is a plan view of a safety pin and leather pull member.

Safety pin 110 is provided with a leather tab 130 extending from the pin, as shown in FIGS. 2 and 4, that is capable of being grasped by the teeth of the user, if required, or secured between the knees or held by the foot of the user, if the hands are disabled and the valve 100 may be operated by pressure from the user's chin or other body member.

Figure 5:
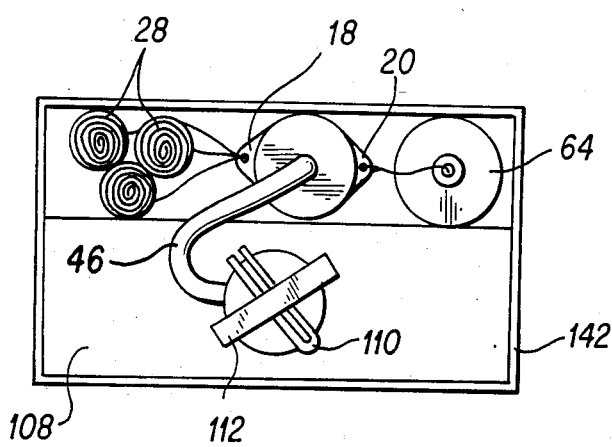
FIG. 5 is a plan view of a casing containing the elements of the signal balloon device forming the package.
Figure 6:
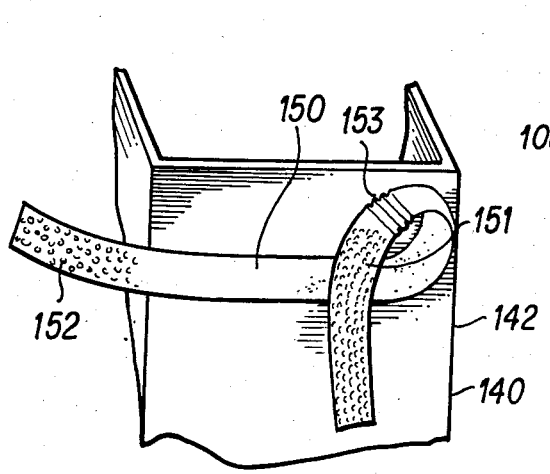
FIG. 6 is a perspective view of the the Velcro and elastic straps attached to the case.
Figure 7:
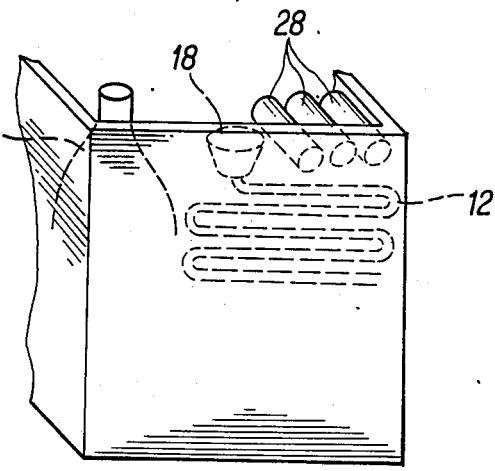
FIG. 7 is a perspective view of the package controls.

Details of the package 140 are shown in FIGS. 5, 6 and 7 and include a casing 142 having a bottom, four vertical sides 144 and foldable top members (not shown). The package 140 is compact and is an openable package that is assembled and ready for use by skiers, hikers, hunters aviators, boatsmen and the like. The package is seen to contain the collapsed balloon 12 and the anchor member 18, the set of reflective streamers 28, the flexible hose 46, the oblong container for the tether line, and the helium container 108. The several components are connected ready for the user; the oblong container 70 holding the tether line 24 and the gas container are secured to the casing 142 so the balloon will not escape from the location of the user after deployment.

The casing 142 has a releasable carrying element 150 consisting of Velcro belting or straps secured to the surface of the casing 142, the Velcro straps having a first Velcro surface 151 on the inside surface of the strap and a second mating Velcro surface 152 on the outside of the strap so that when wrapped around a limb or the body of the person the mating Velcro surfaces engage. An elastic section 153 may be provided to insure that the straps remain in tension when fastened and further help secure the case to the user's body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the following claims.

What is claimed is:

1. A unitized signal balloon device and package assembly for connection to a body of a user comprising:

a package including a casing for (1) a deflated and collapsed plastic type inflatable balloon, (2) a cartridge of compressed gas, (3) an oblong container enclosing a reel of monofilament tether line, one end of the tether line is secured on a portion of an anchor means on the balloon, and (4) a set of several rolled aluminized MYLAR ® radar reflective streamers secured to another portion of the anchor means of the balloon, VELCRO ® means secured onto the package adapted for securing the package to the body of the user, the anchor means being formed at a lower extremity of the inflatable balloon and having an aperture accessing an elastomeric self-sealing end seal of the balloon, a penetrating needle having an axial hollow passage, the penetrating needle piercing the elastomeric self-sealing end seal of the balloon, said penetrating needle and said elastomeric self-sealing end seal forming a quick release valve, a flexible hose communicating between the axial hollow passage and a gas outlet conduit of an impact valve, a second penetrating needle centered over an end seal of the gas cartridge and located within said conduit of said impact valve which upon being forced toward and through the end seal of the gas cartridge permits said gas to pass into said balloon, the impact valve constituting a non-freezing mechanism, the ablong container having a rubber plug at its opening for maintaining friction on the line to keep it from paying out too fast, an alligator spring release clamp affixed to one end of said flexible hose for releaseably engaging a third portion of the anchor means and securing the balloon for release of the balloon when ready for flight, said reel being rotatably mounted on a spindle, and the spindle containing a notch for receiving a member secured the reel to the spindle.

2. The apparatus of claim 1 wherein the balloon has a surface possessing alternate sections of silver sectors and fluorescent orange sectors.

3. The apparatus of claim 1 wherein said impact valve further includes a slide means terminating in an impact handle for depressing and actuating the valve and a safety pin for retaining the slide means in a locked open position until manually removed by the user, the safety pin having a leather pull strap for grasping by the user.

4. The apparatus of claim 1 wherein the balloon is formed of Mylar.

5. The apparatus of claim 3 wherein the leather pull strap is adaptable to grasping by the user's teeth and the impact handle is adaptable to being depressed by a body member of the user such as a chin.

6. A unitized signal balloon device and package assembly for connection to a body of a user comprising:

a package including a casing for containing (1) a deflated and collapsed plastic type inflatable balloon, (2) a cartridge of compressed gas secured onto the casing, (3) a container with a length of monofilament tether line, one end of said tether line is secured on a portion of an anchor means on the balloon, said container being secured to said casing and including means for preventing tangling of the line, and (4) a set of several rolled aluminized MYLAR radar reflective streamers secured to another portion of the anchor means of the balloon, the anchor means being formed at a lower extremity of the inflatable balloon and having an aperture accessing an elastomeric self-sealing end seal of the balloon, a releaseable carrying element affixed to said casing for wrapping around part of the body of the user said carrying element having VELCRO ® means for securing.the the carrying element to said part of the user's body, a penetrating needle having an axial hollow passage, the penetrating needle piercing the elastomeric self-sealing end seal of the balloon, said penetrating needle and said elastomeric self-sealing end seal forming a quick release valve, one end of a flexible hose communicating with the axial hollow passage and a second end of said hose communicating with a gas outlet conduit of an impact valve, a second penetrating needle centered over an end seal of the gas cartridge and located within said conduit of said impact valve which upon being forced toward and through the end seal of the gas cartridge permits said gas to pass into said balloon, the impact valve constituting a non-freezing mechanism, and a spring release clamp affixed to one end of said flexible hose for releaseably engaging a third portion of the anchor means for securing the balloon.

7. The apparatus of claim 6 wherein the balloon has an exterior surface possessing alternate sections of silver sectors and fluorescent orange sectors.

8. The apparatus of claim 6 wherein said impact valve further includes a slide means terminating in an impact handle for depressing and actuating the valve and a safety pin for retaining the slide means in a locked open position until manually removed by the user, the safety pin having a leather pull strap for grasping by the user.

9. The apparatus of claim 6 wherein the balloon is formed of Mylar.

10. The apparatus of claim 8 wherein the leather pull strap is adaptable to grasping by the user's teeth and the impact handle is adaptable to being depressed by a body member of the user such as a chin.

11. A unitized signal balloon device and package assembly for connection to a body of a user comprising:

a package including a casing for containing (1) a deflated and collapsed plastic type inflatable balloon, (2) a cartridge of compressed gas secured onto the casing, (3) a container with a length of monofilament tether line, one end of said tether line is secured on a portion of an anchor means on the balloon, said container being secured to said casing and including means for preventing tangling of the line, and (4) a set of several rolled aluminized MYLAR ® radar reflective streamers secured to another portion of the anchor means of the balloon, the anchor means being formed at a lower extremity of the inflatable balloon and having an aperture accessing an elastomeric self-sealing end seal of the balloon, a releasable carrying element affixed to said casing for wrapping around a part of the body of the user said carrying element having VELCRO ® means for securing the carrying element to said part of the user's body, a penetrating needle having an axial hollow passage, the penetrating needle piercing the elastomeric self-sealing end seal of the balloon, said penetrating needle and said elastomeric self-sealing end seal forming a quick release valve, one end of a flexible hose communicating with the axial hollow passage and a second end of said hose communicating with a gas outlet conduit of an impact valve, a second penetrating needle centered over an end seal of the gas cartridge and located within said conduit of said impact valve which upon being forced toward and through the end seal of the gas cartridge permits said gas to pass into said balloon, the impact valve constituting a non-freezing mechanism, a spring release clamp affixed to one end of said flexible hose for releaseably engaging a third portion of the anchor means for securing the balloon and, the impact valve further including a slide means terminating in an impact handle for depressing and actuating the impact valve, a safety pin for retaining the slide means in a locked open position until manually removed by the user, the safety pin having a leather pull strap for grasping by the user, the leather pull strap being adaptable to grasping by the user's teeth, and the impact handle being adaptable to being depressed by a body member of the user such as a chin.

* * * * *